(12) United States Patent
Drake et al.

(10) Patent No.: US 10,306,731 B2
(45) Date of Patent: May 28, 2019

(54) CONFIGURABLE SWITCH ARRAY

(71) Applicant: TEXAS INSTRUMENTS INCORPORATED, Dallas, TX (US)

(72) Inventors: Michael James Drake, Berthoud, CO (US); Daniel Ross Herrington, Fort Collins, CO (US); Sumeet Prakash Kulkarni, Munich (DE); Vahid Yousefzadeh, Boulder, CO (US); James Michael Patterson, Lafayette, CO (US); James Harbison Masson, Boulder, CO (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 44 days.

(21) Appl. No.: 15/587,995

(22) Filed: May 5, 2017

(65) Prior Publication Data
US 2017/0325300 A1   Nov. 9, 2017

Related U.S. Application Data

(60) Provisional application No. 62/332,933, filed on May 6, 2016.

(51) Int. Cl.
*H05B 33/08* (2006.01)
*H02H 7/20* (2006.01)

(52) U.S. Cl.
CPC ............ *H05B 33/089* (2013.01); *H02H 7/20* (2013.01); *H05B 33/083* (2013.01); *H05B 33/0815* (2013.01); *H05B 33/0845* (2013.01)

(58) Field of Classification Search
CPC combination set(s) only.
See application file for complete search history.

(56) References Cited

U.S. PATENT DOCUMENTS

| | | | |
|---|---|---|---|
| 2011/0273103 A1* | 11/2011 | Hong | H05B 33/0809 315/193 |
| 2013/0021580 A1* | 1/2013 | Morgan | G03B 21/2033 353/31 |
| 2014/0084940 A1* | 3/2014 | Abouda | G01R 31/007 324/538 |
| 2016/0081144 A1* | 3/2016 | Lee | G09G 3/342 315/186 |

* cited by examiner

*Primary Examiner* — Douglas W Owens
*Assistant Examiner* — Jianzi Chen
(74) *Attorney, Agent, or Firm* — Tuenlap Chan; Charles A. Brill; Frank D. Cimino

(57) ABSTRACT

A light emitting diode system allows for high current end user LED matrix applications while mitigating internal damage to control circuitry that may be caused by excess current flow. In one example, multiple switches operate in parallel across an LED. When an overvoltage condition is detected in a first switch, a logic circuit determines those switches programmed to operate in parallel and causes them to conduct current. This reduces the amount of current flowing through any one switch and mitigates harm to the device. The parallel configuration of switches may be driven by a single pulse width modulated current. This allows the drive current to be divided between parallel transistors, limiting the damaging effects that can be caused by high currents flowing through the transistors.

10 Claims, 7 Drawing Sheets

CONFIGURABLE SWITCH ARRAY

RELATED APPLICATIONS

This application claims the benefit of U.S. Provisional application No. 62/332,933, filed May 6, 2016, which is incorporated by reference in its entirety herein.

TECHNICAL FIELD

This invention relates generally to light emitting diode lighting applications and more specifically to control arrangements for light emitting diode lighting applications.

BACKGROUND

Light emitting diode (LED) lighting solutions are replacing incandescent lighting and other less efficient solutions in a number of areas such as automotive headlamps. LEDs are more energy efficient, convert less energy to heat, and last much longer than incandescent bulbs. However, LED lighting solutions use more individual lighting elements than their incandescent counterparts.

LED lighting solutions typically arrange LED lighting elements into a matrix. Depending on the application, an LED matrix can be controlled using an integrated circuit that drives individual LED lighting elements. LED control is often achieved by commutating LED current through a parallel/bypass switch, a process commonly known as shunt or parallel switch dimming. Depending upon the required power/lumen output there can be multiple LEDs in series or parallel, fed by a current source or sink. In many cases, to achieve control of individual LEDs, each LED is bypassed by a switch and controlled using standard pulse width modulation (PWM) dimming techniques. When an overvoltage condition exists across a control switch, the control switch is closed to shunt the current that otherwise flowed through the LED. Large amounts of current flowing through the switch, however, can cause damage to and limit the longevity of a control device.

SUMMARY

Generally speaking, pursuant to the following embodiments, light emitting diode systems according to the following description allow for high current end user LED matrix applications while mitigating internal damage to control circuitry that may be caused by excess current flow. In one example, multiple switches operate in parallel across an LED. When an overvoltage condition is detected in a first switch, a logic circuit determines those switches programmed to operate in parallel and causes them to conduct current. This reduces the amount of current flowing through any one switch and mitigates harm to the device.

In one example, the parallel configuration of switches allows those switches to be driven by a single pulse width modulated current. This allows the drive current to be divided between parallel transistors, limiting the damaging effects that can be caused by high currents flowing through the switches.

These and other benefits may be clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1A:
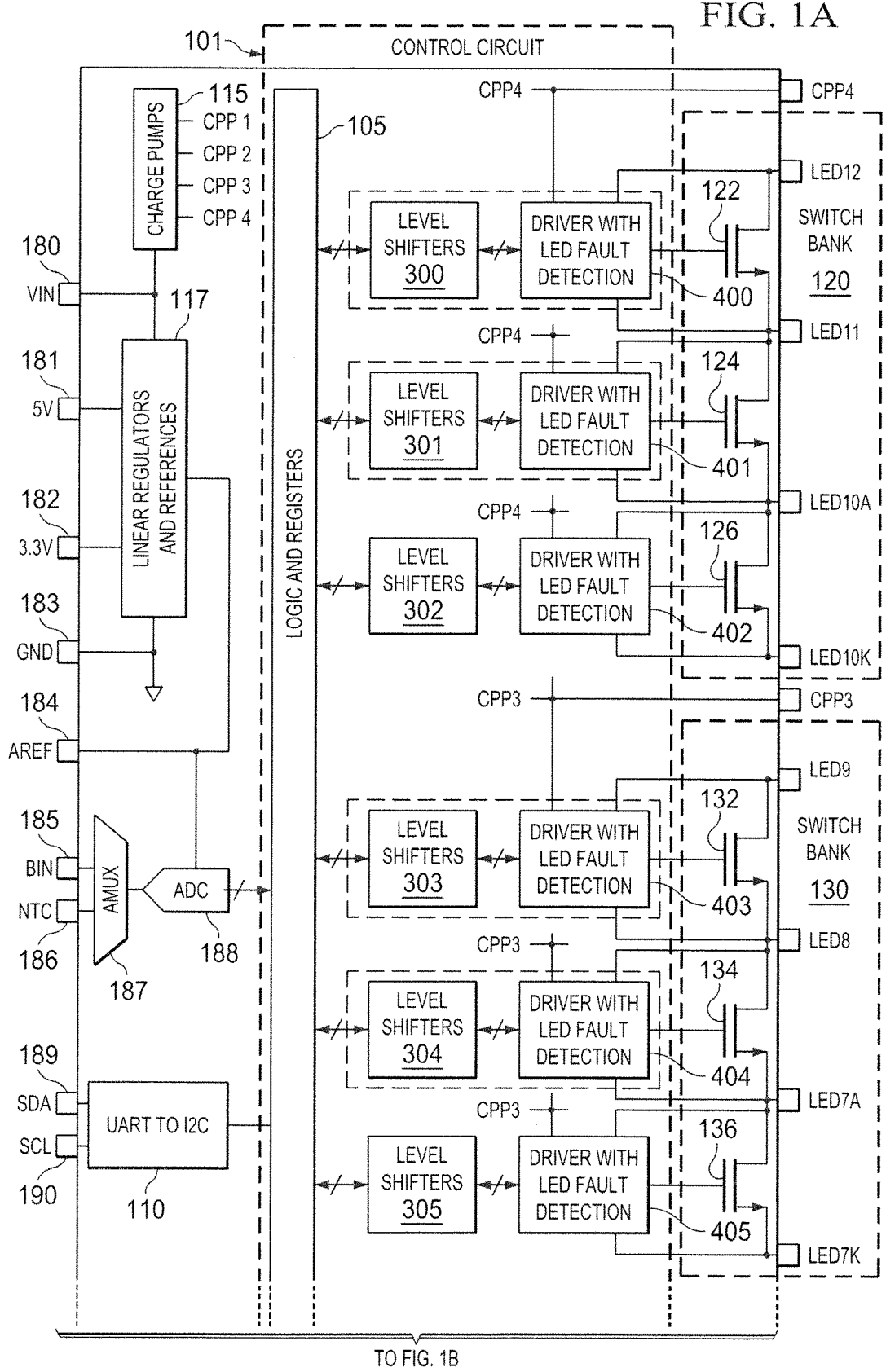
FIG. 1 illustrates a functional block diagram of an example integrated circuit for controlling LEDs as configured in accordance with various embodiments of the invention.
Figure 1B:
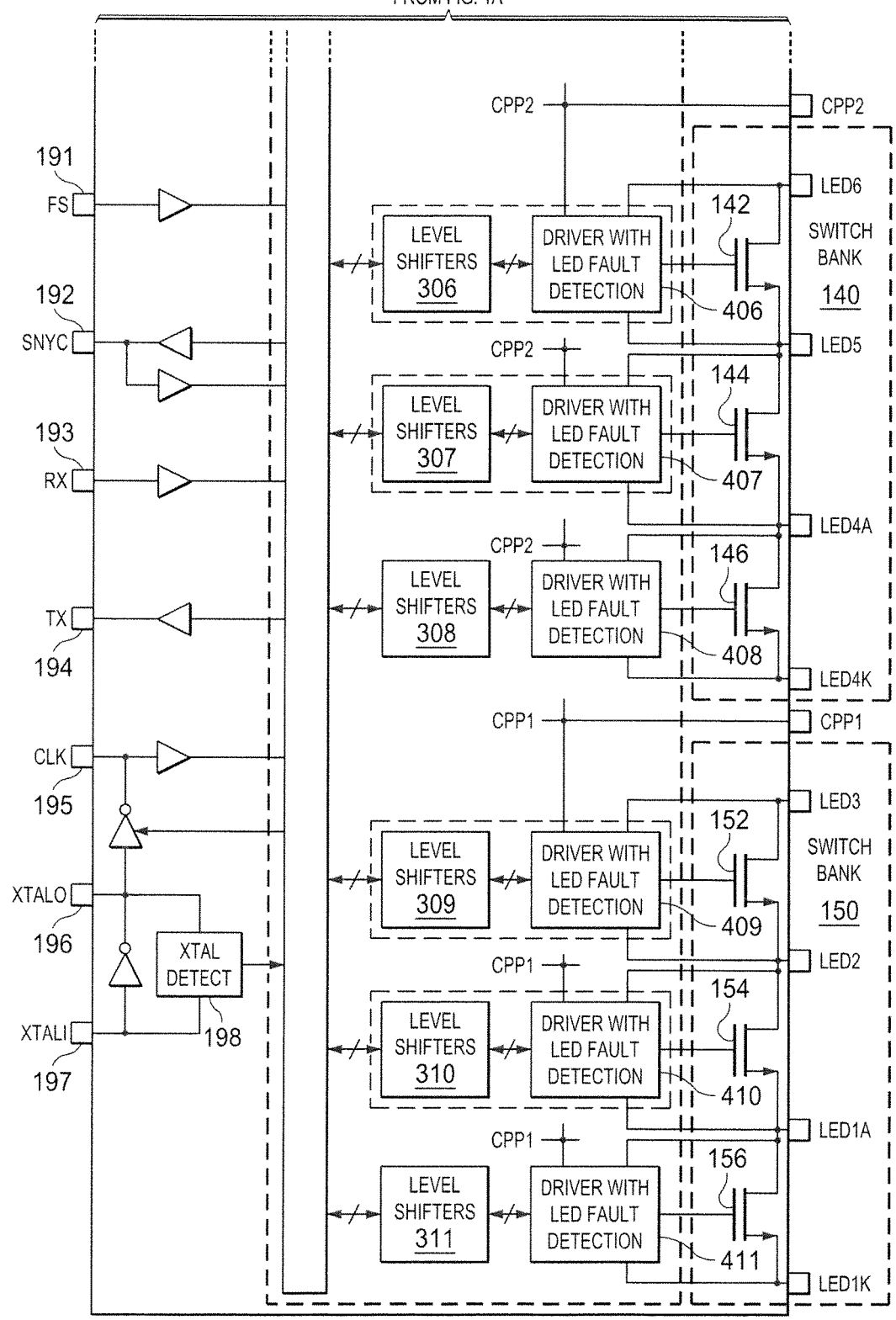

Referring now to the figures, FIG. 1 is a functional block diagram illustrating components of an integrated circuit 100, in this case, an example apparatus for light emitting diode systems. The integrated circuit has voltage inputs VIN 180, a 5V input 181, and a 3.3V input 182. Inputs 181 and 182 are connected to linear regulators and references circuit 117, which is connected to ground line 183. The input 180 is connected to both the charge pumps 115 and the linear regulators and references circuit 117. The analog to digital converter (ADC) 188 may be driven by an external voltage AREF 184. Inputs 185 and 186 are general purpose inputs which can be used, for example, for temperature compensation, binning, or coding. These inputs are fed into the AMUX 187, the output which is fed into the ADC 188, which provides input to the logic and registers 105. Additionally, an address pin (not illustrated) of the integrated circuit 100 is connected to the ADC to extend the addressability of the integrated circuit 100 from eight to thirty-one devices.

Inputs SDA 189 and SCL 190 are I2C data and clock inputs, respectively, for this example implementation. SDA 189 and SCL 190 are connected to the UART to I2C circuit 110. The UART to I2C circuit 110 receives data corresponding to the desired PWM information for internal switches, for example, 122, 124 and 126. In addition, the UART to I2C circuit 110 can send back fault and other diagnostic data to the host, not illustrated. SYNC input 192 receives a synchronization signal so multiple of the integrated circuits 100 can be synchronized across a network. SYNC functionality can be programmed through a serial interface. Input RX 193 and output TX 194 are used to communicated between networked ones of the integrated circuit 100.

In this example, input CLK 195 serves as the primary clock for the integrated circuit 100. Input XTALI 197 is an input to a Pierce oscillator inverter and can be connected to an external crystal circuit. The output XTALO 196 is an output of a Pierce oscillator invertor and can be connected to an external crystal circuit. The XTAL detect circuit 198 connects the XTALO 196 to the system clock only if there have been at least sixteen rising edges on XTALO 196.

The integrated circuit 100 contains a plurality of configurable switch banks, each switch bank having one or more switches configured to electrically connect to at least one light emitting diode to drive the at least one light emitting diode. A switch bank may, for example, comprise three switches; however, a switch bank may contain any number of switches. The integrated circuit 100 may contain any number of switch banks configured as described. In one example, the integrated circuit 100 contains four switch banks each containing three switches. In the illustrated exemplary integrated circuit 100, switches 122, 124, and 126 form one switch bank 120, switches 132, 134, and 136 form one switch bank 130, switches 142, 144, and 146 form one switch bank 140, and switches 152, 154, and 156 form another switch bank 150.

Figure 2:
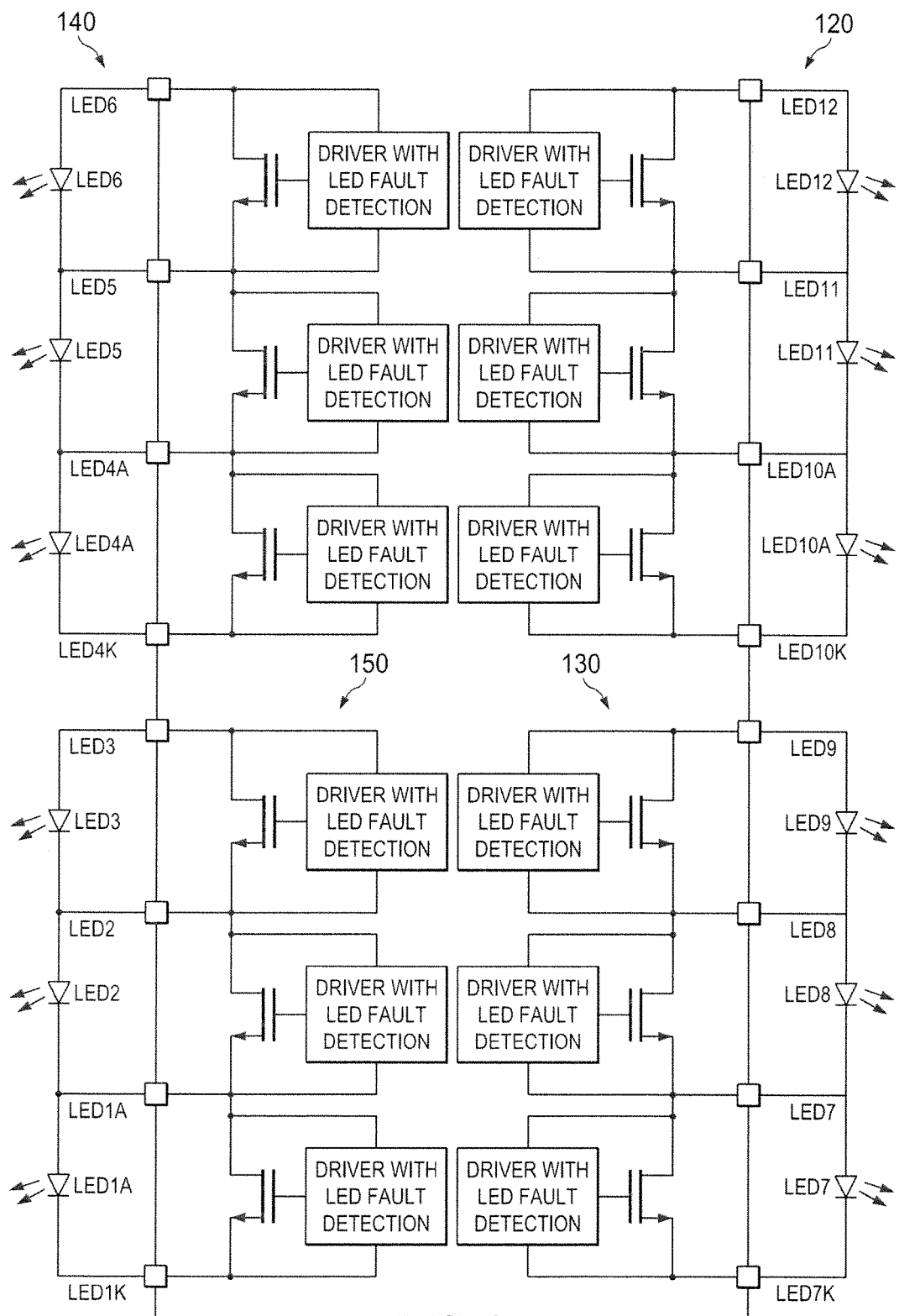
FIG. 2 illustrates a circuit diagram of an example switch and LED configuration as configured in accordance with various embodiments of the invention.
Figure 3:
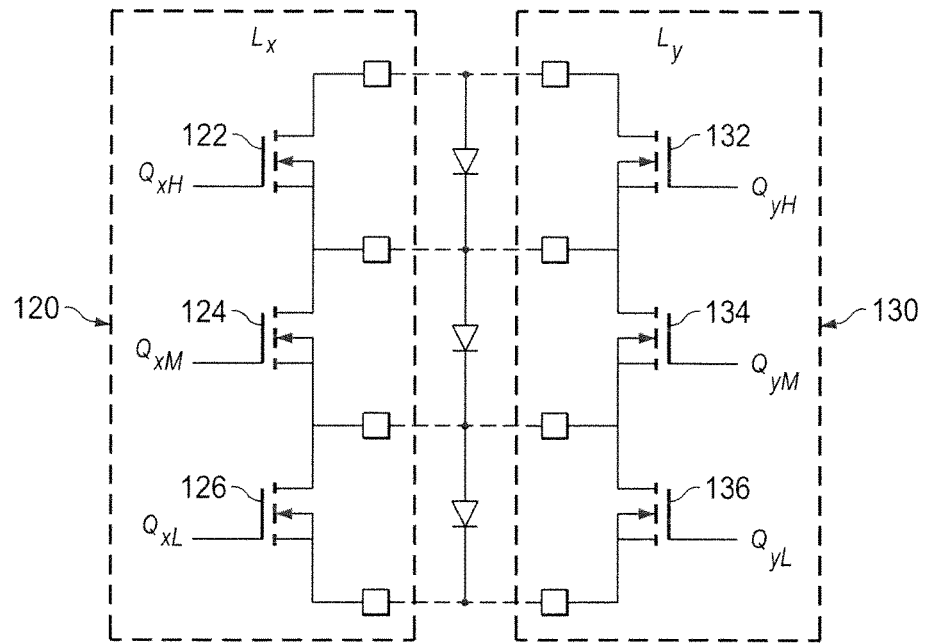
FIG. 3 illustrates a circuit diagram of an example paralleled switch configuration across an LED as configured in accordance with various embodiments of the invention.

FIG. 2 illustrates exemplary individual switch banks 120, 130, 140, and 150. As illustrated, each switch bank may contain three series switches. For example, switch bank 120 contains switches 122, 124, and 126. The switch banks 120, 130, 140, and 150 may be arranged in other ways, for example, as a series combination of twelve switches; a parallel combination of two, three, or four banks of three switches each; or four individual ground referenced three-switch banks. The switch banks 120, 130, 140, and 150 can be configured in any other intermediate series-parallel switch combination. For instance, FIG. 3 illustrates an exemplary series of LEDs, each LED having two switches arranged in parallel across an LED. In this example arrangement, the switches 122, 124, and 126 of switch bank 120 have bank placed in parallel with the switch 132, 134, and 136 of switch bank 130 respectively.

Referring again to FIG. 1, the integrated circuit 100 further contains a control circuit 101 configured to selectively control at least a first switch 122 of a first switch bank 120 and at least a first switch 132 of a second switch bank 130, in parallel. Control circuit 101 receives input from the UART to I2C circuit 110 and drives the switches of the integrated circuit 100 accordingly. The switches may be controlled, for example, by standard pulse width modulation dimming techniques. The control circuit 101 is configured to detect a voltage condition of one of the first switch 122 of the first bank 120 or the first switch 132 of the second bank 130. In one example, illustrated in FIG. 3, a first switch 122 of a first switch bank 120 may be arranged in parallel with a first switch 132 of a second switch bank 130 by programming the logic and registers 105. So arranged, the control circuit 101 is configured to cause the first switch of the second switch bank, 132, to conduct current based at least in part on the voltage condition in the first switch of the first switch bank, 122. For example, when the voltage condition in switch 122 is detected to be outside some threshold, the control circuit 101 will cause the switch 132 to conduct current. In a more specific example, the control circuit 101 is configured to cause the first switch of the second switch bank, 132, to conduct current in response detecting that the voltage condition is above a threshold voltage for the first switch of the first switch bank 122.

Figure 5:
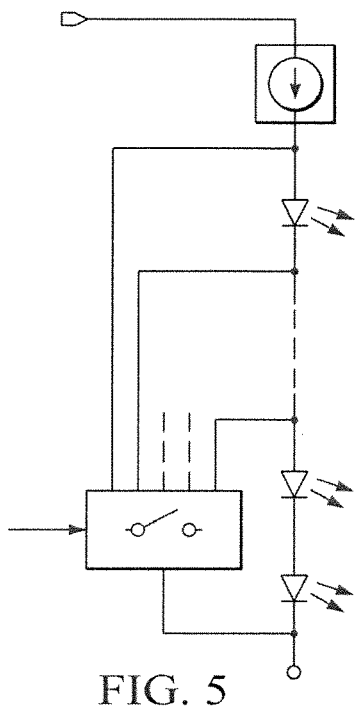
FIG. 5 illustrates a circuit diagram of an example approach to individual parallel switch dimming across a single string of LEDs as configured in accordance with various embodiments of the invention.
Figure 6:
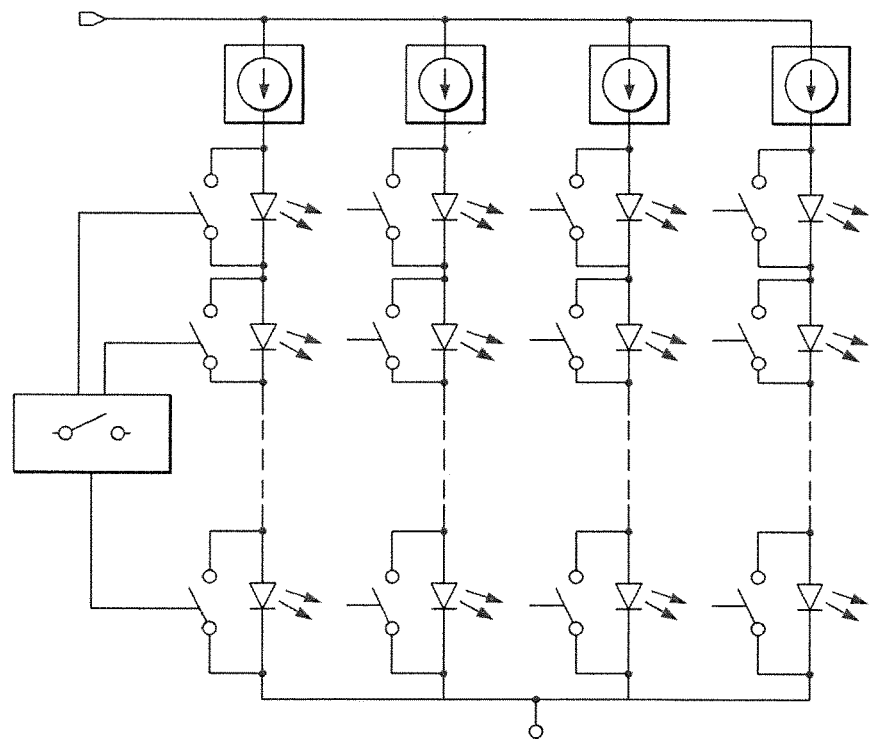
FIG. 6 illustrates a circuit diagram of an example approach to individual parallel switch dimming across multiple strings of LEDs as configured in accordance with various embodiments of the invention.

In one example, the control circuit 101 is configured to determine when the first switch bank 120 and the second switch bank 130 are configured to be controlled in parallel and, in response, apply a driving signal synchronously to both the first switch bank 120 and the second switch bank 130. For example, FIG. 5 illustrates a single pulse width modulated signal being applied to a single series of a LEDs. A similar signal may be applied to multiple series strings of LEDs as illustrated in FIG. 6. In high power applications, it is advantageous to place multiple banks of switches in parallel with a single series string of LEDs as illustrated in FIG. 3. In the arrangement of FIG. 3, the control circuit 101 will recognize that the switch banks, 120 and 130, are programmed to operate in parallel and drive the switch banks with the same pulse width modulated signal. Such an arrangement is advantageous because the drive current does not need to flow through a single switch.

Figure 4:
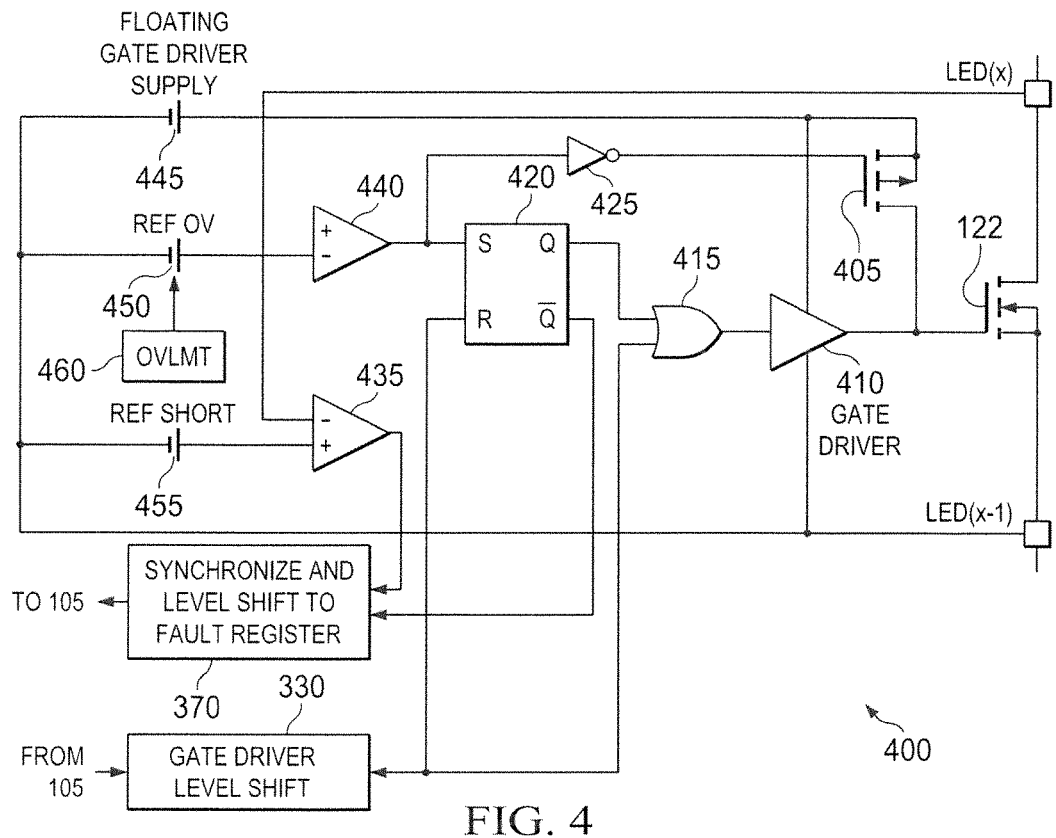
FIG. 4 illustrates a circuit diagram of parts of an example control circuit as configured in accordance with various embodiments of the invention.
Figure 7:
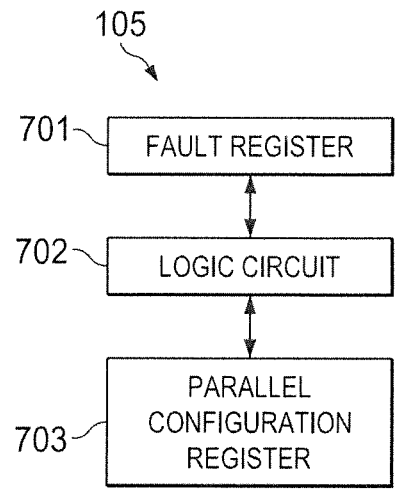
FIG. 7 illustrates a block diagram of parts of a logic and registers circuit as configured in accordance with various embodiments of the invention.

The control circuit 101 includes a plurality of driver circuits 400-411 and a register, wherein individual ones of the plurality of driver circuits are connected to drive individual ones of the first switch bank's 120 one or more switches 122, 124, and 126 and the second switch bank's 130 one or more switches 132, 134, and 136. In one example, the driver circuits 400-411 communicate with the logic and registers 105 via level shifters 300-311. In the exemplary illustration of FIG. 4 the driver 400 is coupled to level shifters 330 and 370. The driver circuits 400-411 are substantially similar, and for ease of description the drivers 400-411 will be described by example in view of the driver circuit 400 as illustrated in FIG. 4. As illustrated in FIG. 7 the register may be, for example, a fault register 701 and be contained within the logic and registers 105. The fault register 701 stores the fault status of LEDs arranged in parallel with the switches of the integrated circuit 100. As can be seen from FIG. 4, the driver circuit 400 has the internal ability to cause its own switch 122 to conduct current when the driver circuit detects an overvoltage condition without needing to signal the logic circuit in the logic and registers 105. To further protect the switch 122 from damage, the driver 400 employs switch 405. For example, in response to the comparator's 440 detecting an overvoltage condition, the switch 405 will drive the gate of switch 122 HIGH via the inverter 425 in approximately 50-100 nano-seconds whereas it takes approximately 20 micro-seconds for the gate driver to respond. The driver 400 communicates the fault status of an LED corresponding to a switch 122 to logic and registers 105 via latch 420 where it is received by the fault register 701. The OR gate 415 takes input from the latch 420 and the gate driver level shift circuit 330. If the input from either latch 420 or level shift circuit 330 is logic HIGH, the OR logic will cause the gate driver 410 to power the gate of the switch 122 causing it to conduct current and bypassing the corresponding LED. Input from the gate driver level shift circuit 330 can cause the latch 420 to reset.

As illustrated in FIG. 4, individual ones of the plurality of driver circuits 400 include an overvoltage detection circuit 440 configured to compare a voltage 445 across a switch 122 to an overvoltage threshold voltage 450 and, in response to detecting that the voltage 445 across the switch 122 exceeds the overvoltage threshold voltage 450, sending a fault detection signal to the fault register 701. In this approach, the driver circuit 300 also includes a short condition detection circuit 435 configured to compare the voltage 445 across the switch 122 to a short circuit condition voltage 455 threshold and, in response to detecting that the voltage 445 across the switch 122 is below the short circuit condition voltage 455, send a fault detection signal to the register. For example, an internal comparator 440 monitors the drain-to-source voltage of the internal switch 122. If the voltage exceeds a threshold, for instance in the event of an open LED failure or overvoltage condition, the device overrides the switch-off signal and turns on the switch 122 thereby maintaining current flow to the rest of the LED string in the presence of a faulty or damaged LED and protects the switch 122. The driver circuit 400 causes the corresponding bit of the fault register 701 in the logic and registers 105 to be set. In a similar example, the driver circuit 400 can detect an LED open detection or under voltage condition of an LED by monitoring the drain-to-source voltage 445 of the internal switch 122. In another example, the voltage condition indicates one of an effectively open circuit condition or an effectively short circuit condition for the one or more light emitting diodes. The driver circuit 400 then causes the logic and registers 105 to set the fault register and send signals to close the switches that are arranged in parallel based on the effectively short circuit condition or the effectively open circuit condition. The logic and registers 105 contain an over voltage limit register. The overvoltage limit register 460 can be set via the UART to I2C circuit 110 to control the effectively open voltage condition. The effectively open voltage condition is a voltage greater than the voltage set in the overvoltage limit register 460. The effectively short voltage is any voltage less than the ref short voltage 455.

In one example, the control circuit 101 further comprises a parallel configuration register 703 configured, at least in part, to specify an association between individual ones of the first switch bank's 120 one or more switches 122, 124, and 126 and the second switch bank's 130 one or more switches 132, 134, and 136. The parallel configuration register 703 is contained in the logic and registers 105 and may be programmed to configure the available switch banks as a series combination of switches; a parallel combination switches; or individual ground referenced three-switch banks. The switch banks can be configured in any other intermediate series-parallel switch combination. The parallel configuration register of integrated circuit 100 is to programmed to set the applied paralleling configuration and is contained in the logic and registers 105. The parallel configuration register may be set, for example, by an external MCU communicating with the logic and registers 105 through UART to I2C circuit 110.

As illustrated in FIG. 7, the logic and registers 105 of the control circuit 101 includes a logic circuit 702, the logic circuit operable to control individual ones of the first switch bank's 120 one or more switches 122, 124, and 126 based at least in part on the voltage condition of the second switch bank's 130 one or more switches 132, 134, and 136 and the association between individual ones of the first switch bank's 120 one or more switches 122, 124, and 126 and the second switch bank's 130 one or more switches 132, 134, 136. The logic circuit 702 may be coupled a fault register 701. The fault register 701 configured to store a fault status of one or more light emitting diodes arranged electrically in parallel with one or more of the plurality of switches of the integrated circuit 100. The logic circuit 702 may be coupled to, for example, the parallel configuration register 703, the fault register 702, and each driver circuit 400-411. In one example, upon receiving a fault status signal from the driver 400, the logic circuit 702 determines which switches are programmed to operate in parallel with the switch for which the driver 400 reported a fault status based on the content of the parallel configuration register 703 and causes those switches to close by signaling their respective driver 400. In another example, after a driver circuit 400 communicates a fault status corresponding to an LED arranged in parallel with a switch 122, to the fault register 701, the fault register 701 and the parallel configuration register 703 will be polled. If other switches are programmed to operate in parallel with the switch 122 for which the driver 400 communicated a fault status signal to the logic circuit 702, the logic circuit 702 will cause those switches programmed to operate in parallel with switch 122 to close (i.e., conduct current).

Figure 8:
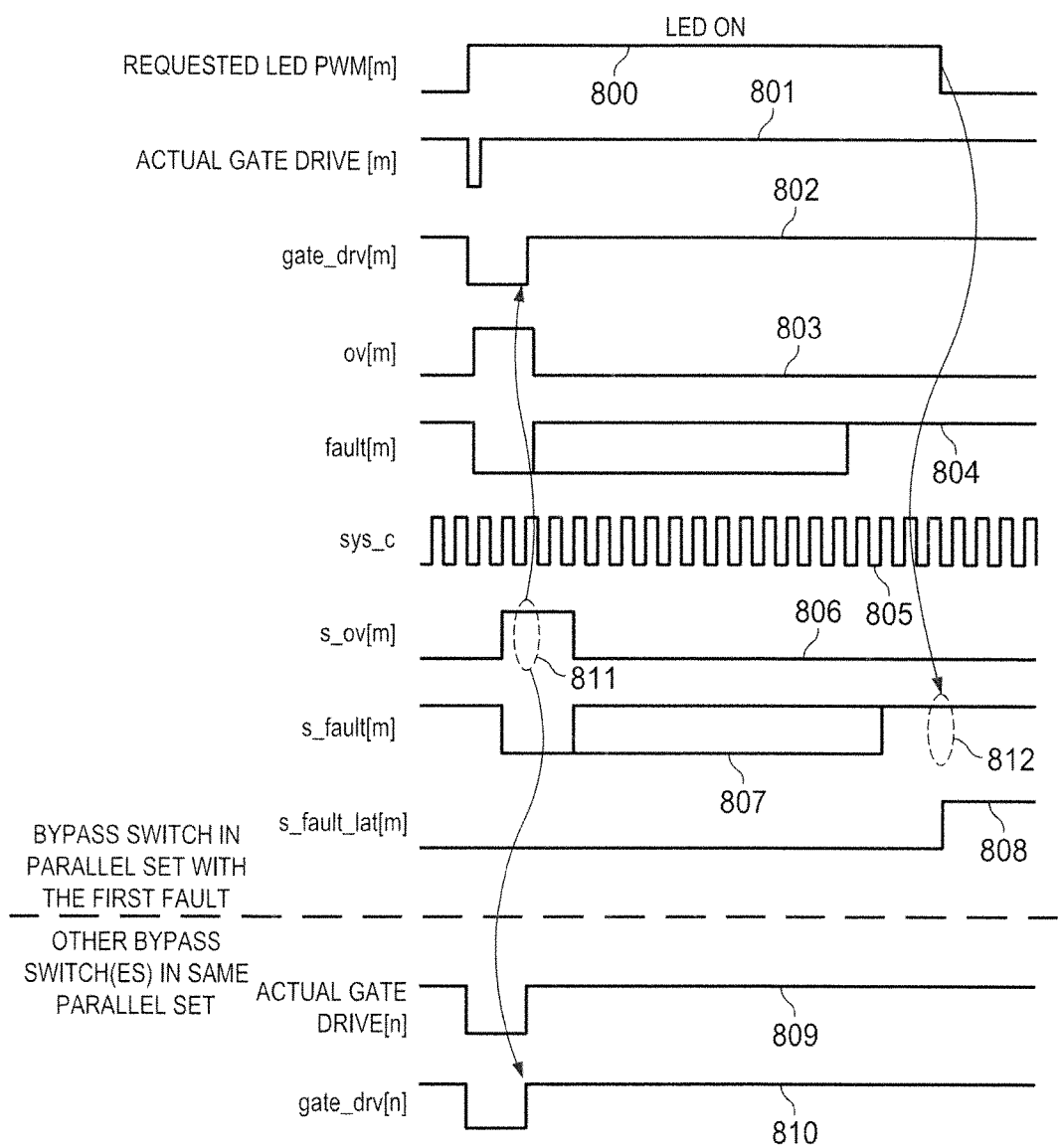
FIG. 8 illustrates example logic signals for controlling parallel switches as configured in accordance with various embodiments of the invention.

FIG. 8 is a logic signal diagram. Signals ov[m] 803 and fault[m] 804 are output from the driver circuit 400 through sync & level shift to fault register circuit 370 to the logic and registers 105 and are synchronized to the system clock. The signals ov[m] 803 and fault[m] 804 separately, together, or in combination may be considered a fault status signal. The sys_c signal 805 represents the frequency of the system clock. The arrow 811 represents the point in time in which the logic and registers 105 can read the signals from the driver 400 and cause switches programmed to operate in parallel to be closed. There is a delay of a number of clock cycles between when the driver 400 detects an overvoltage condition and when the logic and registers 105 can close the switches 122 programmed to be in parallel. The actual gate drive[m] 801 and actual gate drive[n] 809 signals illustrate this delay. The delay is much shorter in the driver 400 that detected the overvoltage condition because the driver 400 internally closed its own switch in response to detecting the overvoltage condition. The signal $gate_{13}$ drv[m] 802 and the signal $gate_{13}$ drv[n] 810 are inputs to the driver 400. In the case of an overvoltage or under voltage condition being detected in a first switch 122, the logic and registers 105 will determine the switches of the integrates circuit 100 programmed to be in parallel with the first switch and cause those switches to close by transmitting a $gate_{13}$ drv[n] signal 810 to a gate driver level shift block 330 of a driver 400. Once received, the signal will cause the OR gate 415 to transmit logic HIGH to the gate driver and close the switch.

The fault[m] 804 signal is synchronized to the system clock and represented by s_fault[m] 807. The logic and registers 105 uses the signal s_fault[m] 807 to determine an under voltage condition. For example, the logic and registers 105 will close the switch of the driver 400 and any other driver 400 that were programmed to be in parallel when an under voltage condition is determined.

The output signal from the comparator 435 may be combined using OR logic at sync and level shift to fault register circuit 370 with an output of the latch 420. In such a case the logic and registers 105 will not be able to distinguish whether an under voltage condition or an over voltage condition has occurred; however, if one of those conditions did occur, the logic and registers will determine which switches to close based on the contents of the parallel configuration register 703.

As illustrated in FIG. 8 by arrow 812 the synchronized fault inputs are latched into the FAULT registers on the falling edge of the requested LED ON time to allow the controller to poll which LEDs had an open or short fault at the end of the LED ON pulse. The s_fault[m] signal 807 is sampled a number of clock cycles prior to the falling edge of the requested LED PWM[m] signal 800, and bits in the fault register 701 in the logic and circuits 105 corresponding to the switch 122 corresponding to the s_fault[m] 807 signal are set in response to the s_fault_lat[m] signal 808.

Figure 9:
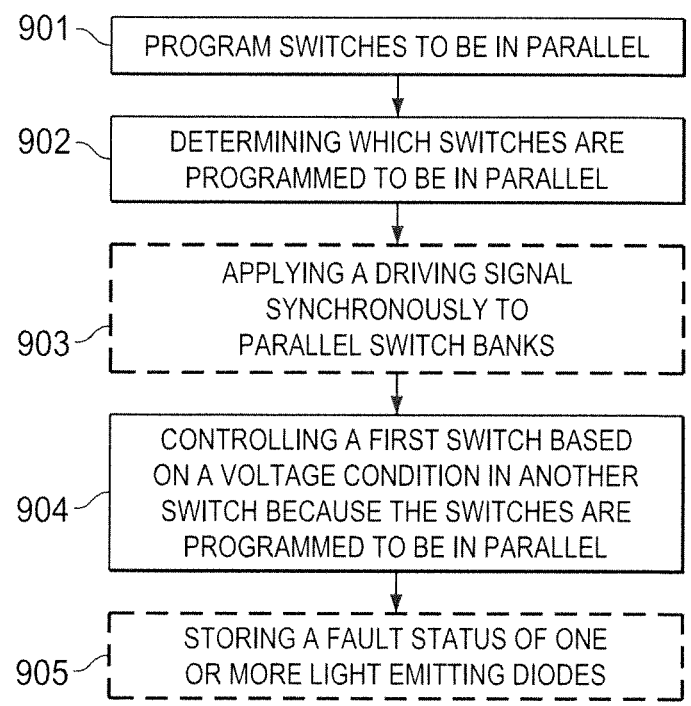
FIG. 9 illustrates a flow chart of an example method of operation as configured in accordance with various embodiments of the invention.

FIG. 9 is a flow chart illustrating an example operation of an integrated circuit device controlling programmed parallel switches as described above. At step 900 the integrated circuit is programmed by an external device to create a series/parallel relationship between switches of the switch banks 120, 130, 140, and 150. For example, the integrated circuit 100 may associate a first configurable switch bank 120 and a second configurable switch bank 130 by programming the first configurable switch bank 120 to operate in parallel to the second configurable switch bank 130. The association may be in response to input from an external MCU. At step 901, the control circuit 101 determines which switches are programmed to be in parallel by using a parallel configuration register 703 in the logic and registers 105. For example, the integrated circuit 100 may determine whether individual ones of the switches of the first configurable switch bank 120 and the second configurable switch bank 130 are programmed to operate in parallel based on the association.

Optionally, at step 902 the integrated circuit 100 can drive switch banks arranged in parallel with a synchronous pulse width modulated signal. For example, the integrated circuit 100 may perform the step of applying a driving signal synchronously to both the first configurable switch bank 120 and the second configurable switch bank 130 when the first configurable switch bank 120 and the second configurable switch bank 130 are configured to operate in parallel.

At step 903 the control circuit 101 controls, for example, a switch 132 because it is programmed to be parallel to switch 122. The control circuit 101 may cause switch 132 to conduct current because of a voltage condition detected in the switch 122. For example, the integrated circuit 100 may control the individual ones of the switches of the second switch bank 130 based on voltage conditions in individual ones of the switches in the first configurable switch bank 120 and the association between individual ones of the first switch bank's 120 one or more switches 122, 124, and 126 and the second switch bank's 130 one or more switches 132, 134, and 136. The voltage condition may be, for example, an effectively open circuit condition or an effectively short circuit condition. For example, the integrated circuit 100 may cause a first switch of the second switch bank to conduct current based on the voltage condition in a first switch of the first switch bank when the voltage condition is one of an effectively open circuit condition or an effectively short circuit condition.

Optionally, at step 904 the control circuit 101 stores a fault status of one more LEDs corresponding to the switches of the integrated circuit 100. For example, the integrated circuit 100 stores a fault status of one or more light emitting diodes arranged in parallel with one or more of the plurality of switches of the first and the second configurable switch banks, 120 and 130. In response to the driver circuit's 400 detecting an overvoltage or under voltage condition of a corresponding switch 122, the driver circuit 400 communicates a fault status to the logic and registers 105. For example, the integrated circuit 100 stores a fault status of one or more light emitting diodes arranged in parallel with one or more of the plurality of switches of the first and the second configurable switch banks, 120 and 130. The logic and registers 105 uses the parallel configuration register 703 to determine those switches programmed to be in parallel with the switch 122 whose driver 300 reported a fault and causes those switches to conduct current.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. An apparatus for light emitting diode systems, the apparatus comprising:
a plurality of configurable switch banks, each switch bank having one or more switches configured to electrically connect to at least one light emitting diode to drive the at least one light emitting diode; and
a control circuit configured to selectively control at least a first switch of a first switch bank and at least a first switch of a second switch bank in parallel,
the control circuit being configured to cause the first switch of the second switch bank to conduct current based at least in part on a voltage condition in the first switch of the first switch bank.

2. The apparatus of claim 1 wherein the control circuit is configured to detect the voltage condition of one of the first switch of the first bank or the first switch of the second bank.

3. The apparatus of claim 1, wherein the control circuit is configured to cause the first switch of the second switch bank to conduct current in response detecting that the voltage condition is above a threshold voltage for the first switch of the first switch bank.

4. A method of controlling a plurality of configurable switch banks, each switch bank having one or more switches configured to electrically connect to at least one light emitting diode and to drive the at least one light emitting diode, the method comprising:
associating a first configurable switch bank and a second configurable switch bank by programming the first configurable switch bank to operate in parallel to the second configurable switch bank;
determining whether individual ones of the switches of the first configurable switch bank and the second configurable switch bank are programmed to operate in parallel based on the association; and controlling the individual ones of the switches of the second switch bank based on voltage conditions in individual ones of the switches in the first configurable switch bank and the association.

5. The method of claim 4, wherein the controlling the individual ones of the switches of the second switch bank based on voltage conditions in individual ones of the switches in the first configurable switch bank and the association comprises:

causing a first switch of the second switch bank to conduct current based on the voltage condition in a first switch of the first switch bank when the voltage condition is one of an effectively open circuit condition or an effectively short circuit condition.

6. The method of claim 4, further comprising applying a driving signal synchronously to both the first configurable switch bank and the second configurable switch bank when the first configurable switch bank and the second configurable switch bank are configured to operate in parallel.

7. The method of claim 4, further comprising storing a fault status of one or more light emitting diodes arranged in parallel with one or more of the plurality of switches of the first and the second configurable switch banks.

8. The method of claim 7 wherein the fault status is based on the voltage condition.

9. An apparatus for light emitting diode systems, the apparatus comprising:

a plurality of configurable switch banks, each switch bank having one or more switches configured to electrically connect to at least one light emitting diode to drive the at least one light emitting diode; and a control circuit configured to selectively control at least a first switch of a first switch bank and at least a first switch of a second switch bank in parallel, wherein the control circuit further comprises:

a parallel configuration register, the parallel configuration register configured, at least in part, to specify an association between individual ones of the first switch bank's one or more switches and the second switch bank's one or more switches; and a logic circuit, the logic circuit operable to control individual ones of the first switch bank's one or more switches based on at least the voltage condition of the second switch bank's one or more switches and the association.

10. The apparatus of claim 9, the control circuit further comprising a plurality of driver circuits and a register, wherein individual ones of the plurality of driver circuits are connected to drive individual ones of the first switch bank's one or more switches and the second switch bank's one or more switches, wherein individual ones of the plurality of driver circuits comprise:

an overvoltage detection circuit configured to compare a voltage across a driver switch to an overvoltage threshold voltage and in response to detecting that the voltage across the driver switch exceeds the overvoltage threshold voltage, sending a fault detection signal to the register;

a short condition detection circuit configured to compare the voltage across the driver switch to a short circuit condition voltage threshold and in response to detecting that the voltage across the driver switch is below the short circuit condition voltage, sending a fault detection signal to the register.

* * * * *